United States Patent [19]

Karl

[11] Patent Number: 5,562,926
[45] Date of Patent: Oct. 8, 1996

[54] FILM-BLOWING PLANT FOR MANUFACTURING PLASTIC FILMS

[76] Inventor: Veit-Holger Karl, Nürnberger Strasse 119, D-97076 Würzburg, Germany

[21] Appl. No.: 546,523

[22] Filed: Oct. 20, 1995

Related U.S. Application Data

[63] Continuation of Ser. No. 146,098, Jan. 5, 1994, abandoned.

[30] Foreign Application Priority Data

May 10, 1991 [DE] Germany .......................... 41 15 353.7

[51] Int. Cl.⁶ .................................................. B29C 47/88
[52] U.S. Cl. ...................... 425/72.1; 425/141; 425/326.1
[58] Field of Search ............................. 425/72.1, 326.1, 425/387.1, 140, 141, 149; 264/40.3, 568, 569

[56] References Cited

U.S. PATENT DOCUMENTS

| | | | |
|---|---|---|---|
| 4,118,453 | 10/1978 | Herrington | 425/387.1 X |
| 4,373,273 | 2/1983 | Church | 425/326.1 X |
| 4,399,094 | 8/1983 | Fujitani et al. | 264/569 X |
| 4,443,400 | 4/1984 | Herrington | 264/569 X |
| 4,472,343 | 9/1984 | Kawamura et al. | 425/326.1 X |
| 4,624,823 | 11/1986 | Audureau et al. | 264/569 |
| 4,826,414 | 5/1989 | Planeta | 264/568 X |
| 5,281,375 | 1/1994 | Konermann | 264/40.3 |

FOREIGN PATENT DOCUMENTS

| | | | |
|---|---|---|---|
| 273739 | 7/1988 | European Pat. Off. | |
| 59-7019 | 1/1984 | Japan | 425/72.1 |
| 59-89123 | 5/1984 | Japan | 425/72.1 |
| 62-246714 | 10/1987 | Japan | |
| 9015707 | 12/1990 | WIPO | |

*Primary Examiner*—Richard L. Chiesa
*Attorney, Agent, or Firm*—Edwin D. Schindler

[57] ABSTRACT

A film blowing plant for manufacturing plastic films from thermoplastics, having a blow head, above which is disposed an air cooling ring (1) and behind it in the direction of movement of the film a measuring device for the film thickness, whereby the cooling capacity across the circumference of the tube can be controlled variably by altering the throughput quantity of the air cooling ring (1) and respective adjustment in every region is controlled according to the measurement values of the measuring devices, and the air cooling ring (1) has openings (4) distributed across the circumference in front of air outlet (2) in the region of and in the flow direction of the air (3), through which air is supplied or released.

8 Claims, 3 Drawing Sheets

FILM-BLOWING PLANT FOR MANUFACTURING PLASTIC FILMS

This is a continuation of application Ser. No. 08/146,098, filed Jan. 5, 1994, now abandoned.

BACKGROUND OF THE INVENTION

1. Technical Field of the Invention

The invention concerns a film blowing plant for manufacturing films from thermoplastics, having a blow head, above which is disposed an air cooling and behind it in the direction of movement of the film a measuring device for the film thickness, whereby the cooling capacity across the circumference of the tube can be controlled variably by altering the throughput quantity of the air cooling ring and respective adjustment in every region is controlled according to the measurement values of the measuring device.

2. Description of the Prior Art

A device of this generic concept is disclosed in DE-PS 3743, which stems from the same applicant, with which the film thickness is recorded across its circumference via a measuring device and in case of deviations from the target value at the correspondingly assigned place of the circumference of the still flexible blown film, the cooling capacity is altered and adjusted. When the cooling capacity is increased the stretching of the film which takes place in this region of the plant is decreased due to the rapid solidification, so that a comparatively thick wall thickness remains. On the other hand, with a reduction of the cooling capacity the time is extended during which the film can be stretched, resulting in a further reduction of the wall thickness. The cooling capacity is influenced by altering the throughput quantity of the air passing the air cooling ring. In order to execute a varying effect across the circumference of the tubular film, the air cooling ring is subdivided by partition walls extending in a radial direction and thus forming sectors whose upper and/or lower borders' spatial position is changed, so that the cross section available to the cooling air and consequently the throughput quantity in this region is influenced.

In practice, the device of this generic concept has shown itself to be encumbered with considerable disadvantages. On the one hand, the partition walls only permit a sharp alteration in the cooling performance across the circumference of the tubular foil, which, however, should be correspond to the conditions and seen from the point of view of the circumference of the tubular film should be comparatively continuous. Furthermore, the partition walls result, due to flow-dynamic reasons, in the formation of vortexes and other irregular point-by-point flows, which means an undefined and largely uncontrolled influencing of the cooling capacity.

SUMMARY OF THE INVENTION

On this basis it is the object of this invention to improve this kind of film blowing plant so that a continuous operation of the cooling performance of the air cooling ring is possible across the circumference of the tubular film.

This object is solved according to this invention therein that the air cooling ring has openings distributed across the circumference in front of the air outlet in the region of and in the flow of the air, through which the air is supplied or released.

The invention borrows the prior art idea of altering and adjusting the cooling capacity across the circumference of the tube in that the throughput quantity of the air cooling ring is controlled and adjusted variably across the circumference. The core idea consists in the concrete implementation of the throughput quantity of the air cooling ring. Thus influencing the throughput quantity is achieved in that while retaining the cross section of the air outlet of the air cooling ring, air is supplied or released with the aid of openings distributed across the circumference of the air cooling ring. From the functional point of view if follows that, due to the air supplied and released through the openings, an increase/decrease, per time unit, will be brought about in the air which passes through and acts as a cooling medium. To achieve a point-by-point targeted influencing of the air-outlet-quantity across the circumference of the air cooling ring, the openings must be disposed in the region of the air outlet, since otherwise within the air cooling ring a compensatory flow would result in a tangential direction, which prevents a point-by-point influencing and adjusting of the cooling capacity. Both the addition as well as the drawing off of air is possible through each of the openings. The supplied air is added to the existing air in the air cooling ring, which is supplied centrally, so that via the air outlet, per time unit, a large quantity emerges, consequently increasing the cooling capacity in the circumference of the tubular film defined by the respective opening. However, when air is drawn off, the amount passing the air outlet, and consequently also the cooling capacity, is reduced. The arrangement of the openings in front of the air outlet ensures that the turbulences, which occur and are produced due to the meeting and superposition of two air flows consisting of different direction and strength, remain essentially in the interior of the air cooling ring and die out, thus ensuring that in the region of the air outlet, but especially when meeting the blown film tubing, laminar flow conditions prevail. The same applies with different impingement of neighboring openings to the prevailing flow conditions at the air outlet. In addition, there is a certain equalization, so that even with varying impingement of individual openings no erratic changes prevail across the circumference of the air outlet.

The advantages achievable thereby are the following: Due to the aforementioned reasons, unlike the partition walls known from the prior art, no erratic changes arise, but a comparatively uniform course of cooling capacity across the circumference. Furthermore, the formation of vortexes, which frequently occur due to the outer edge of every partition wall which acts as a break-away edge, is fully avoided. As a result one obtains a a variably adjustable cooling capacity across the circumference with steady transitions, without the appearance of uncontrollable flow vortexes. To be seen as a further advantage is that the control unit for the impingement of each opening can be disposed far outside the air cooling ring and without spatial restriction, something that especially facilitates the use of valves with linear characteristics.

Within the framework of the invention the number and size of the individual openings and their distance apart is largely free in scope. Their respective size and spacing defines and determines the fineness, i.e. the smallest possible angle as concerns the center line of the blown film tubing, of influencing and altering the cooling capacity. In order to exert influence across the entire circumference of the blown film tubing, it is recommended to dispose the openings in such a number and size that in their entirety, i.e. in their projection toward the center of the blown film tubing, they cover the circumference of the air cooling ring. Of course, this does not mean that the neighboring openings are connected spatially. The individual openings can be staggered in a radial direction, however, in their entirety they must produce the circumference of the air cooling ring. Hereby, it is basically conceivable that the neighboring openings overlap, i.e. with a radial offset, their projections intersect toward the center of the tube, with the result that still no connections arise between the neighboring openings. However, the idea according to this invention also includes the case in which the neighboring openings are connected to one another, so that in their entirety they form an annular gap. Influencing across the circumference then happens in varying manner through angle-dependent release or supply of air via this annular gap.

In an advantageous embodiment, control of air supply and release is done via a control unit, which is connected to the opening via a line. The advantage consists therein that outside of the air cooling ring there is sufficient space for the use of known and purchasable control equipment. Especially valves with linear characteristics can be used in a trouble-free manner.

In the sense of the invention the term "line" is to be broad in interpretation and, on the one hand, includes hoses or tubes, and, on the other hand, every kind of connection transmitting control signals. In the first case, the line is used for guidance and the transport to and from the opening, whereby the quantity of air flowing through is defined and determined by the control unit.

On the other hand, the line can be used to forward the control signals from the control unit to an actuator disposed in the region of the air outlet and via this actuator to define and alter the quantity of air flowing through. Especially and discussed in greater depth below, the actuator could be a lip whose spatial adjustment is achieved and done via a toggle lever and whose adjustment is determined by the control unit.

The structural embodiment and implementation of the air cooling ring with the openings according to the invention is largely open in scope within the framework of the invention. The invention sees a solution as especially advantageous whereby within the air cooling ring a lip is disposed which acts in a direction opposing the air flow and whose spatial adjustment can be altered. The lip partially describes the opening. From a functional point of view it divides the arriving air flow into a part which is led away by the opening and a second part which reaches the air outlet. Through the change in the spatial position, the mixture ratio of the two air parts can be altered.

If the opening is arranged adjacent to the air outlet, the lip can be used as a partition wall between both openings and/or their ducts. A change in their spatial position enlarges the opening and simultaneously reduces the air outlet or vice versa. Hereby the lip itself does not alter the air outlet, rather, in the direction of the flow, before this the effective (clear) cross section of the air flowing through and reaching the air outlet.

The lip, which is used as a separating wall between the duct leading to the air outlet and the opening, can, provided the latter is a circumferential annular gap, be designed as a ring whose edge facing the flow can be changed in its position. When the edge is moved in one direction, the cross section available to the respective flow, which leads to the air outlet or through the openings, is enlarged or reduced, thus enabling quantitative control. At the same time, the sum of the two cross sections remains constant during every control phase.

The concrete structural implementation of the lip proposed according to this invention can, in the case of rigid material, be done by swivelling in the region of the lip which lies opposite the edge facing the flow and which is used for fastening. In the event of a ring as a lip, it is recommended to either select an elastic material, which permits varying adjustment across the circumference, or to dispose slots extending radially toward the center of the ring, thus producing tongues, each of which is assigned and actuator, and as a result of which each being independently alterable in their positions.

In order to alter the spatial position of the edge facing the flow the actuator must as a logical necessity be disposed at least partially in the air flow. Here it is recommended to let the actuator engage from the side of the opening and/or the line, i.e. from the side on which the air is released outwards, in order to avoid vortexes in the air flow leading to the air outlet which lead to negative effects upon the bubble.

Within the framework of the invention the concrete embodiment of the actuator is basically optional. It is recommended to use a lever bar which is operated by the control unit and which engages the lip.

In view of the structural arrangement, largely symmetrical relationships are recommended, which are arise in that opposite the air outlet, in a radial direction, are disposed the openings with the beginning of the lines which lead away.

To create defined and reproducible control conditions, which, in view of the movement of the lip, should additionally largely be capable of linearisation, so that the alteration in cross section of the flow cross sections adjacent to one another is proportional to the quantity flowing through, the structure of the air cooling ring is to be dimensioned in such a way that the flow resistance for the air released via the air outlet is more or less the same as the resistance for the air escaping via the openings. This optimum target can be approached if the cross sections offered to both the air emerging via the air outlet as well as air released via the openings are approximately the same during the normal operating state.

In one embodiment it is proposed to direct the air within the air cooling ring in a radial direction and to divide it into two flows via a lip, correspondingly likewise essentially pointing in a radial direction, which are both then guided in an axial direction either to the air outlet, i.e. to the film, or in the opposite direction via the opening to the line which is directed away from the opening.

Finally, it is planned, for the concrete implementation, to dispose a disc coaxially and at a distance to the air cooling ring in which the air collected by the opening is carried away and essentially in a radial direction is then lead away from the air cooling ring outwardly.

BRIEF DESCRIPTION OF THE DRAWING FIGURES

Further details features and advantages of the invention can be taken from the following description part in which a typical embodiment of the invention is explained in greater detail with the aid of the drawing. It shows:

FIGS. 1a, b the section of an air cooling ring according to this invention which shows the air outlet;

FIGS. 2a, b an air cooling ring with a lip used for control; and,

FIG. 3 an air cooling ring according to FIG. 2 with a lip disposed in the region of the air outlet.

DETAILED DESCRIPTION OF THE PREFERRED EMBODIMENTS

Figure 1A:
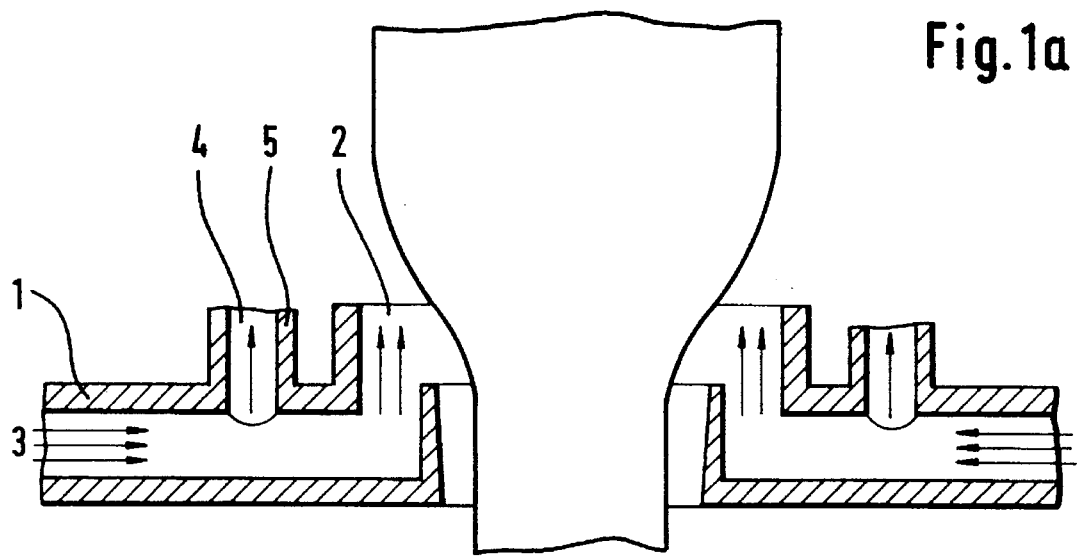

FIG. 1 shows sectorially an air cooling ring (1) in cross section. The air outlet (2) can be seen, via which the air (3)

in the drawing, which flows in from the left side, reaches the tube shown outside.

The quantity of air escaping deviates usually from the air (3) flowing in from the left side, in that via an opening (4) air is supplied or led away in a defined manner. For this, opening (4) is connected to a control unit, which is not shown here, via a line (5). Through the addition of air or its exhaust via opening (4), one is able control the capacity of the cooling air escaping via air outlet (2) across the circumference of air cooling ring (1) and to variably adjust and influence it in a defined manner.

Figure 1B:
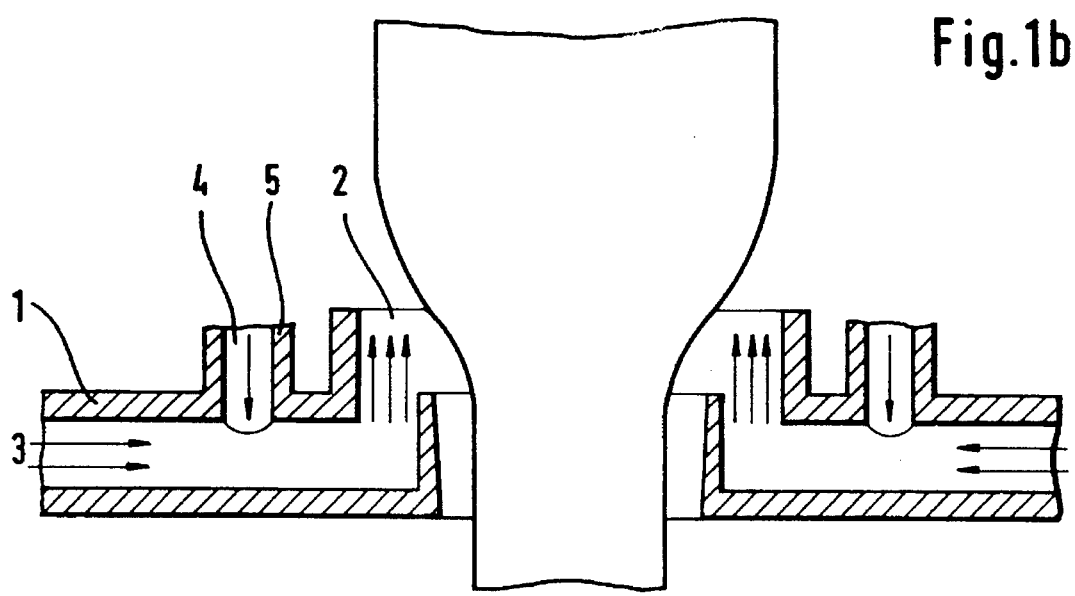

FIG. 1 and FIG. 2 differ solely in that in the case of FIG. 1 air is sucked off via opening (4) and supplied corresponding to the direction of the arrow in FIG. 1b. This is therefore the same device with different directions of air flowing through the opening.

Figure 2A:
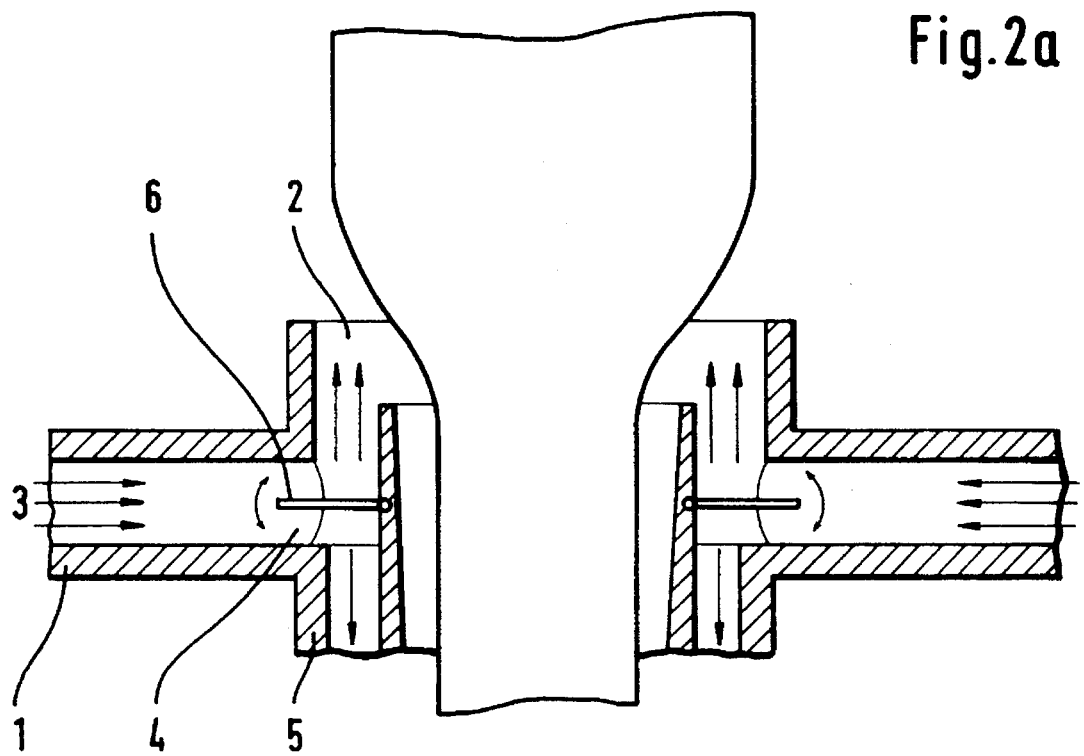
Figure 2B:
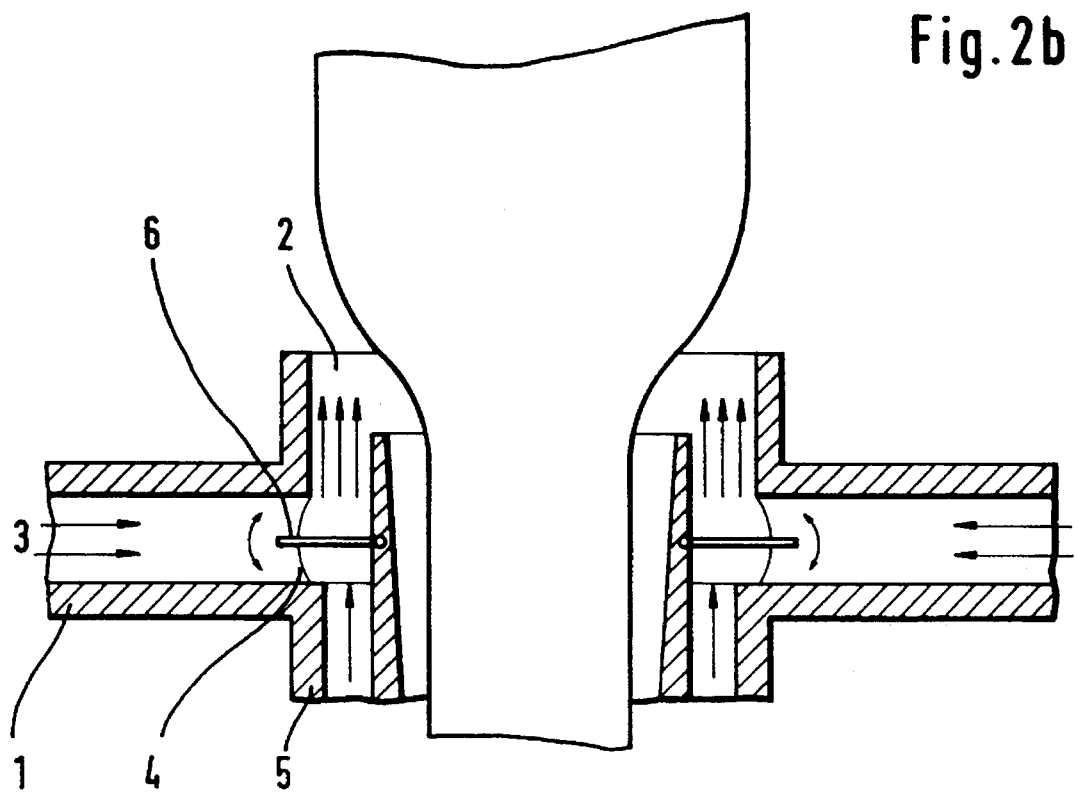

The embodiment shown in FIG. 2 as an alternative likewise shows the section of an air cooling ring (1) in which the supply of air (3), its release via air outlet (2) as well as the air cooling ring (1) matches the representation described in FIG. 1. The decisive difference consists therein that a lip (6) is directed more or less against the direction of air flow (3), so that arriving air (3) is divided into a part upwards toward air outlet (2) and into a further part reaching line (5). Lip (6) is alterable as concerns it spatial position and makes, since it partially borders opening (4), the opening's cross section facing the flow alterable. Movement of lip (6) changes and influences the part of the arriving flowing air (3) reaching air outlet (2). Without limiting generality, this embodiment is particularly suitable if principally the arriving air flow is to be partially led away (FIG. 2a). However, basically the possibility of supplying air via line (5) and opening (4) is not ruled out (FIG. 2b).

Figure 3:
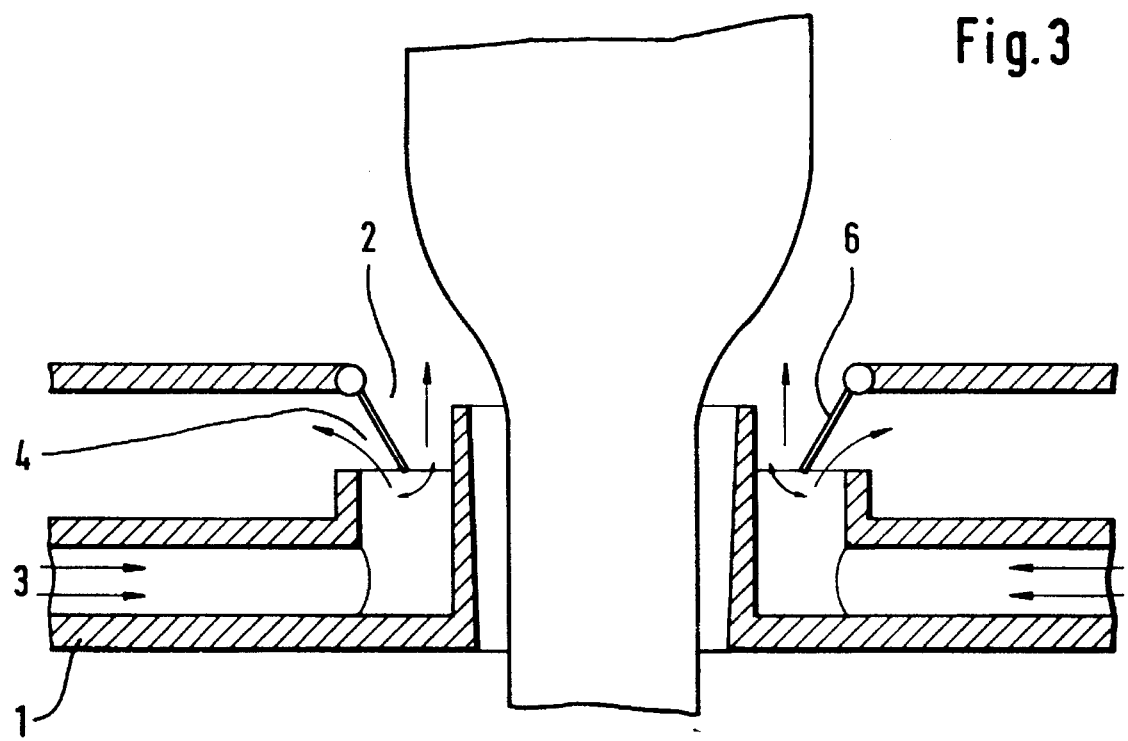

In FIG. 3 an embodiment is represented in which lip (6) is arranged in the region of air outlet (2) and opening (4) as a kind of partition wall, so that if the spatial position of lip (6) is altered, the cross section of the air flowing to air outlet (2) is simultaneously enlarged and the part flowing to opening (4) is reduced (or vice versa). It is to be clarified that not air outlet (2) itself, but, in the direction of flow, the cross section offered to the air arriving and reaching air outlet (2) in front of it is effectively altered. Simultaneously, the cross section of the air reaching opening (4) is altered and influenced in the opposing sense. The design solution shown in FIG. 3 is characterized by an especially simple and low-priced structural implementation.

As a result one is given the possibility via a large number of openings (4) disposed across the circumference of air cooling ring (1) to achieve an individual supply and removal of air for influencing the cooling capacity. Retained essentially remains the flow behavior of air (3) escaping via air outlet (2). At the same time, steady operation is guaranteed across the circumference of the air cooling ring when the cooling capacity is altered.

I claim:

1. A film blowing plant for manufacturing a plastic film from a thermoplastic material, comprising:

a blow head;

means for measuring the thickness of a plastic film; and, an air cooling ring being positioned adjacent said blow head wherein cooling capacity across the circumference of a tube is able to be controlled variably by altering a throughput quantity of said air cooling ring and respective adjustment in every region is controlled according to measurement values obtained from said means for measuring, said air cooling ring further including openings distributed across its circumference in front of an outlet in a region of, and in the flow direction of, air through which the air is led away and, in said air cooling ring, the air is conveyed in a radial direction, and a lip being positioned in a center plane of, and facing, an air flow, said lip being fastened at a point in the center plane of said air flow and forming a ring whose edge is pivotable about its point of fastening, and arriving air is divided via said lip, wherein said openings form an annular gap which, in an axial direction, is located opposite said air outlet, said lip simultaneously bordering both an inlet of said annular gap and a duct to said air outlet and pointing radially outwardly against the direction of flow, and the arriving air is directed in an axial direction to said air outlet and is further directed via the annular gap to a line which leads away from said annular gap.

2. The film blowing plant according to claim 1, wherein said air cooling ring comprises an elastic material and has slots extending radially from the edge facing the flow toward the center of said air cooling ring, thereby forming a tongue operable in combination with a corresponding actuator.

3. The film blowing plant according to claim 2, wherein at said lip, said corresponding actuator engages from a side of the annular gap.

4. The film blowing plant according to claim 2, wherein at said lip, said corresponding actuator engages from a side of said line.

5. The film blowing plant according to claim 2, wherein said corresponding actuator is a lever bar operable by a control unit.

6. The film blowing plant according to claim 1, wherein said air cooling ring is dimensioned so that flow resistance of the air released via said air outlet is substantially the same as that of air escaping via said annular gap.

7. The film blowing plant according to claim 6, wherein respective cross-sections distances available to the air released from said air outlet and to the air led off via said annular gap, in the region of said lip, are substantially the same.

8. The film blowing plant according to claim 1, wherein said line, which leads away from said annular gap, is formed by a coaxial disc which is positioned at a distance to said air cooling ring.

* * * * *